US00RE43188E

(19) United States
(12) Reissued Patent
Robertsson et al.

(10) Patent Number: US RE43,188 E
(45) Date of Reissued Patent: Feb. 14, 2012

(54) METHOD AND SYSTEM FOR REDUCING EFFECTS OF SEA SURFACE GHOST CONTAMINATION IN SEISMIC DATA

(75) Inventors: Johan Robertsson, Grantchester (GB); Julian Edward Kragh, Finchingfield (GB); James Edward Martin, Hovik (GB)

(73) Assignee: Schlumberger Technology Corporation, Sugar Land, TX (US)

(21) Appl. No.: 12/264,784

(22) Filed: Nov. 4, 2008

Related U.S. Patent Documents

Reissue of:
(64) Patent No.: 6,775,618
Issued: Aug. 10, 2004
Appl. No.: 09/936,863
PCT Filed: Mar. 21, 2000
PCT No.: PCT/GB00/01074
§ 371 (c)(1),
(2), (4) Date: Nov. 30, 2001
PCT Pub. No.: WO00/57207
PCT Pub. Date: Sep. 28, 2000

U.S. Applications:
(62) Division of application No. 11/501,195, filed on Aug. 8, 2006, now Pat. No. Re. 41,656.

(30) Foreign Application Priority Data

Mar. 22, 1999 (GB) ..... 9906456

(51) Int. Cl.
*G01V 1/00* (2006.01)
*G01V 1/38* (2006.01)

(52) U.S. Cl. ..... 702/14; 367/24

(58) Field of Classification Search ..... 367/15, 367/20–21, 24, 87–89; 702/14, 1–2, 17–18, 702/81, 84, 127, 137–138, 142–143, 150–153, 702/182–183, 189–191, 195, 197; 181/101, 181/108, 110–113, 122; 703/5, 9–10
See application file for complete search history.

(56) References Cited

U.S. PATENT DOCUMENTS
2,757,356 A 7/1956 Haggerty
(Continued)

FOREIGN PATENT DOCUMENTS
GB 2 090 407 A 7/1982
(Continued)

OTHER PUBLICATIONS
Pierson, W J and Moskowitz, L A Proposed Spectral From for Fully Developed Wind Seas Based on the Similarity Theory of S A Kitaigorodskii Journal of Geophysical Research, vol. 69, No. 24, Dec. 1964, pp. 5181-5190.
Hasselmann, D E, Dunckel, M and Ewing J A Directional Wave Spectra Observed during JONSWAP 1973 Journal of Physical Oceanography, vol. 10, 1980, pp. 1264-1280.
(Continued)

*Primary Examiner* — Michael Nghiem
*Assistant Examiner* — Toan M Le

(57) ABSTRACT

An improved de-ghosting method and system that utilizes multi-component marine seismic data recorded in a fluid medium. The method makes use of two types of data: pressure data that represents the pressure in the fluid medium, such as sea water, at a number of locations; and vertical particle motion data that represents the vertical particle motion of the acoustic energy propagating in the fluid medium at a number of locations within the same spatial area as the pressure data. The vertical particle motion data can be in various forms, for example, velocity, pressure gradient, displacement, or acceleration. A spatial filter is designed so as to be effective at separating up and down propagating acoustic energy over substantially the entire range of non-horizontal incidence angles in the fluid medium. The spatial filter is applied to either the vertical particle motion data or to the pressure data, and then combined with the other data to generate pressure data that has its up and down propagating components separated.

8 Claims, 13 Drawing Sheets

U.S. PATENT DOCUMENTS

| | | | | | |
|---|---|---|---|---|---|
| 3,747,055 | A | | 7/1973 | Greene, Jr. | |
| 4,222,266 | A | | 9/1980 | Theodoulou | |
| 4,486,865 | A | | 12/1984 | Ruehle | |
| 4,979,150 | A | | 12/1990 | Barr | |
| 5,051,961 | A | * | 9/1991 | Corrigan et al. | 367/24 |
| 5,365,492 | A | | 11/1994 | Dragoset, Jr. | |
| 5,524,100 | A | * | 6/1996 | Paffenholz | 367/24 |
| 5,581,514 | A | * | 12/1996 | Moldoveanu et al. | 367/16 |
| 5,621,700 | A | * | 4/1997 | Moldoveanu | 367/24 |
| 5,696,734 | A | | 12/1997 | Corrigan | |
| 5,754,492 | A | * | 5/1998 | Starr | 367/24 |
| 5,850,922 | A | | 12/1998 | Fraser | |
| 6,101,448 | A | * | 8/2000 | Ikelle et al. | 702/17 |
| 6,493,636 | B1 | * | 12/2002 | DeKok | 702/17 |

FOREIGN PATENT DOCUMENTS

| | | | |
|---|---|---|---|
| GB | 2 333 364 | A | 7/1999 |
| GB | 2 341 680 | A | 3/2000 |
| WO | 97/44685 | A1 | 11/1997 |

OTHER PUBLICATIONS

Robertsson, J O A A numerical free-surface condition for elastic/viscoelastic finite-difference modeling in the presence of topography Geophysics, vol. 61, No. 6, Nov.-Dec. 1996, pp. 1921-1934.

Robertsson, J O A, Blanch, J O and Symes, W W Viscoelastic finite—difference modeling Geophysics, vol. 59, No. 9, Sep. 1994, pp. 1444-1456.

Barr, F J and Sanders, J I Attenuation of Water-Column Reverberations Using Pressure and Velocity Detectors in a Water-Bottom Cable Annual Meeting of Society Expl. Geophys, Jan. 1989, XP 000672198, pp. 653-656.

Amundsen, L, Seacrest, B G and Arntsen, B Extraction of the normal component of the particle velocity from marine pressure data Geophysics, vol. 60, No. 1, Jan.-Feb. 1995, pp. 212-222.

Schneider, W A, Lamer, K L., Burg, J P and Backus, M M A new data—processing technique for the elimination of ghost arrivals on reflection seismograms Geophysics, vol. 29, No. 5, Oct. 1964, pp. 783-805.

White, J E Plane waves Seismic waves: radiation, transmission and attenuation, McGraw-Hill, 1965, chapter 2, pp. 14-77.

* cited by examiner

METHOD AND SYSTEM FOR REDUCING EFFECTS OF SEA SURFACE GHOST CONTAMINATION IN SEISMIC DATA

Matter enclosed in heavy brackets [ ] appears in the original patent but forms no part of this reissue specification; matter printed in italics indicates the additions made by reissue.

*More than one reissue applications have been filed for the reissue of U.S. Pat. No. 6,775,618, where this application Ser. No. 12/264,784, filed on Nov. 4, 2008 is a divisional reissue application of a co-pending U.S. reissue application Ser. No. 11/501,195, filed on Jun. 8, 2006, for the reissue of U.S. Pat. No. 6,775,618, which was a national phase application, Ser. No. 09/936,863, filed on Sep. 18, 2001 of an international application, Ser. No. PCT/GB00/01074, filed on Mar. 21, 2000, which claims priority of a GB application, S/N GB 9906456, filed on Mar. 22, 1999; and where U.S. reissue application Ser. No. 11/501,195 was issued as U.S. Pat. No. Re. 41,656 on Sep. 7, 2010.*

FIELD OF THE INVENTION

The present invention relates to the field of reducing the effects of sea-surface ghost reflections in seismic data. In particular, the invention relates an improved de-ghosting method that utilises measurements or estimates of multi-component marine seismic data recorded in a fluid medium.

BACKGROUND OF THE INVENTION

Removing the ghost reflections from seismic data is for many experimental configurations equivalent to up/down wave field separation of the recorded data. In such configurations the down-going part of the wavefield represents the ghost and the up-going wavefield represents the desired signal. Exact filters for up/down separation of multi-component wavefield measurements in Ocean Bottom Cable (OBC) configurations have been derived by Amundsen and Ikelle, and ar described in U.K. Patent Application Number 9800741.2. An example of such a filter corresponding to de-ghosting of pressure data at a frequency of 50 Hz for a seafloor with P-velocity of 2000 m/s, S-velocity of 500 m/s and density of 1800 kg/m3 is shown in FIG. 2. At this frequency, the maximum horizontal wavenumber for P-waves right below the seafloor is $k=0.157\ m^{-1}$, whereas it is $k=0.628\ m^{-1}$ for S-waves. Notice the pole and the kink due to a zero in the filter at these two wavenumbers, making approximations necessary for robust filter implementations. FIG. 3 shows approximations co the filter. These filters are only good at wavenumbers smaller than the wavenumber where the pole occurs. Hence, energy with low apparent velocities (for instance S-waves or Scholte waves at the seafloor) will not be treated properly. Moreover, since they do not have a complex part, evanescent waves will also not be treated properly.

The OBC de-ghosting filters have been shown to work very well on synthetic data. However, apart from the difficulty with poles and zeros at critical wave numbers, they also require knowledge about the properties of the immediate sub-bottom locations as well as hydrophone/geophone calibration and coupling compensation.

A normal incidence approximation to the de-ghosting filters for data acquired at the sea floor was described by Barr, F. J. in U.S. Pat. No. 4,979,150, issued 1990, entitled 'System for attenuating water-column reflections', (hereinafter "Barr (1990)"). For all practical purposes, this was previously described by White, J. E., in a 1965 article entitled 'Seismic waves: radiation, transmission and attenuation', McGraw-Hill (hereinafter "White (1965)"). However, this technique is not effective when the angle of incidence is away from vertical. Also, this technique does not completely correct for wide-angle scattering and the complex reflections from rough sea surfaces. Additionally, its is believed that the OBC techniques described have not been used successfully in a fluid medium, such as with data gathered with towed streamers.

SUMMARY OF THE INVENTION

Thus, it is an object of the present invention to provide a method of de-ghosting which improves attenuation of noise from substantially all non-horizontal angles of incidence.

It is an object of the present invention to provide a method of de-ghosting of seismic measurements made in a fluid medium which improves attenuation of the ghost as well as downward propagating noise from substantially all non-horizontal angles of incidence.

Also, it is an object of the present invention to provide a method of de-ghosting which is not critically dependent on knowledge about the properties of the surrounding fluid medium as well as hydrophone/geophone calibration and coupling compensation.

Also, it is an object of the present invention to provide a method of de-ghosting whose exact implementation is robust and can be implemented efficiently.

According to the invention, a method is described for sea surface ghost correction through the application of spatial filters to the case of marine seismic data acquired in a fluid medium. Using, for example, either typical towed streamer or vertical cable geometries. Preferably, both pressure and vertical velocity measurements are acquired along the streamer. The invention takes advantage of non-conventional velocity measurements taken along a marine towed streamer, for example. New streamer designs are currently under development and are expected to become commercially available in the near future. For example, the Defence Evaluation and Research Agency (DERA), based in Dorset, U.K., claim to have successfully built such a streamer for high frequency sonar applications.

According to an alternative embodiment, the invention is also applicable to seismic data obtained with configurations of multiple conventional streamers. Here, the filters make use of vertical pressure gradient measurements, as opposed to velocity measurements. According to the invention, an estimate of the vertical pressure gradient can be obtained from over/under twin streamer data, or more generally from streamer data acquired by a plurality of streamers where the streamers are spatially deployed in a manner analogous to that described in U.K Patent Application Number 9820049.6, by Robertsson, entitled 'Seismic detection apparatus and related method" filed in 1998 (hereinafter "Robertsson (1998)"). For example, three streamers can be used, forming a triangular shape cross-section along their length. Vertical pressure gradient data can also be obtained from pressure gradient measuring devices.

According to the invention, the filters fully account for the rough sea perturbed ghost, showing improvement over other techniques based on normal incidence approximations (see e.g., White (1965)), which have been applied to data recorded at the sea floor.

Advantageously, according to preferred embodiments of the invention, the results are not sensitive to streamer depth, allowing the streamer(s) to be towed at depths below swell noise contamination, hence opening up the acquisition weather window where shallow towed streamer data would be unusable. Local streamer accelerations will be minimised in the deep water flow regime, improving resolution of the pressure, multi-component velocity and pressure gradient measurements.

Advantageously, according to preferred embodiments of the invention, there are no filter poles in the data window, except for seismic energy propagating horizontally at the compressional wave speed in water.

Advantageously, according to preferred embodiments of the invention, the filter is not critically dependent on detailed knowledge of the physical properties of the surrounding fluid medium.

The filters can be simple spatial convolutions, and with the regular geometry of typical towed streamer acquisition the filters are efficient to apply in the frequency-wavenumber (FK) domain. The filters can also be formulated for application in other domains, such as time-space and intercept time-slowness ($\tau$-p)

According to the invention, a method of reducing the effects in seismic data of downward propagating reflected and scattered acoustic energy travelling in a fluid medium is provided. The method advantageously makes use of two types of data: pressure data, that represents the pressure in the fluid medium, such as sea water, at a number of locations; and vertical particle motion data, that represents the vertical particle motion of the acoustic energy propagating in the fluid medium at a number of locations within the same spatial area as the pressure data. The distance between the locations that are represented by the pressure data and the vertical particle motion data in each case is preferably less than the Nyquist spatial sampling criterion. The vertical particle motion data can be in various forms, for example, velocity, pressure gradient, displacement, or acceleration.

The spatial filter is created by calculating a number of coefficients that are based on the velocity of sound in the fluid medium and the density of the fluid medium. The spatial filter is designed so as to be effective at separating up and down propagating acoustic energy over substantially the entire range of non-horizontal incidence angles in the fluid medium.

The spatial filter is applied to either the vertical particle motion data or to the pressure data, and then combined with the other data to generate pressure data that has its up and down propagating components separated. The separated data are then processed further and analysed. Ordinarily the down-going data would be analysed, but the up going data could be used instead if the sea surface was sufficiently calm.

According to an alternative embodiment, a method of reducing the effects of downward propagating reflected and scattered acoustic energy travelling in a fluid medium is provided wherein the pressure data and vertical particle motion data represent variations caused by a first source event and a second source event. The source events are preferably generated by firing a seismic source at different locations at different times, and the distance between the locations is preferably less than the Nyquist spatial sampling criterion.

The present invention is also embodied in a computer-readable medium which can be used for directing an apparatus, preferably a computer, to reduce the effects in seismic data of downward propagating reflected and scattered acoustic energy travelling in a fluid medium as otherwise described herein.

BRIEF DESCRIPTION OF THE DRAWINGS

FIGS. 6a-6f show various embodiments for data acquisition set-ups and streamer configurations according to preferred embodiments of the invention;

DETAILED DESCRIPTION OF THE INVENTION

Figure 1:
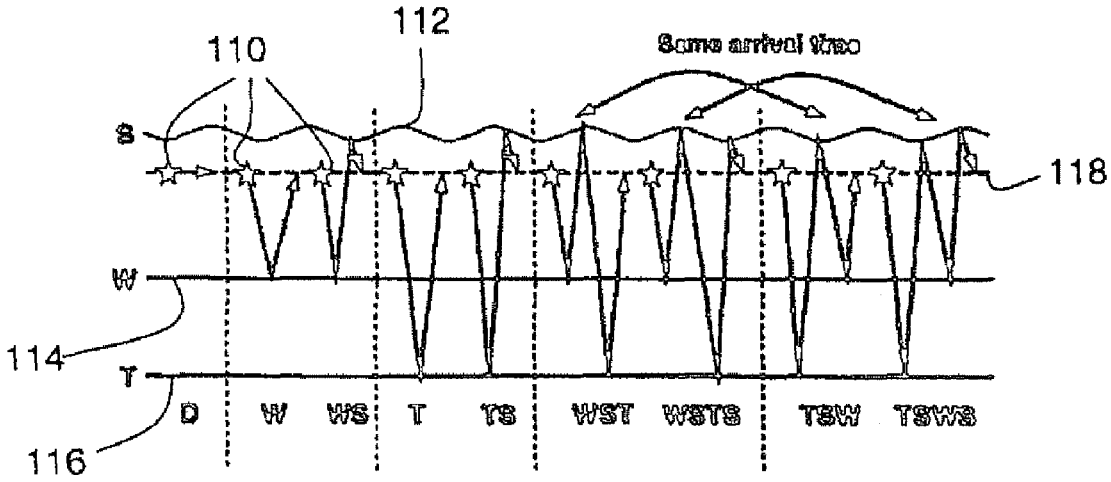
FIG. 1 shows examples of simple seismic ray paths for primary events, and ghosts that are last reflected from the rough sea-surface.
Figure 2:
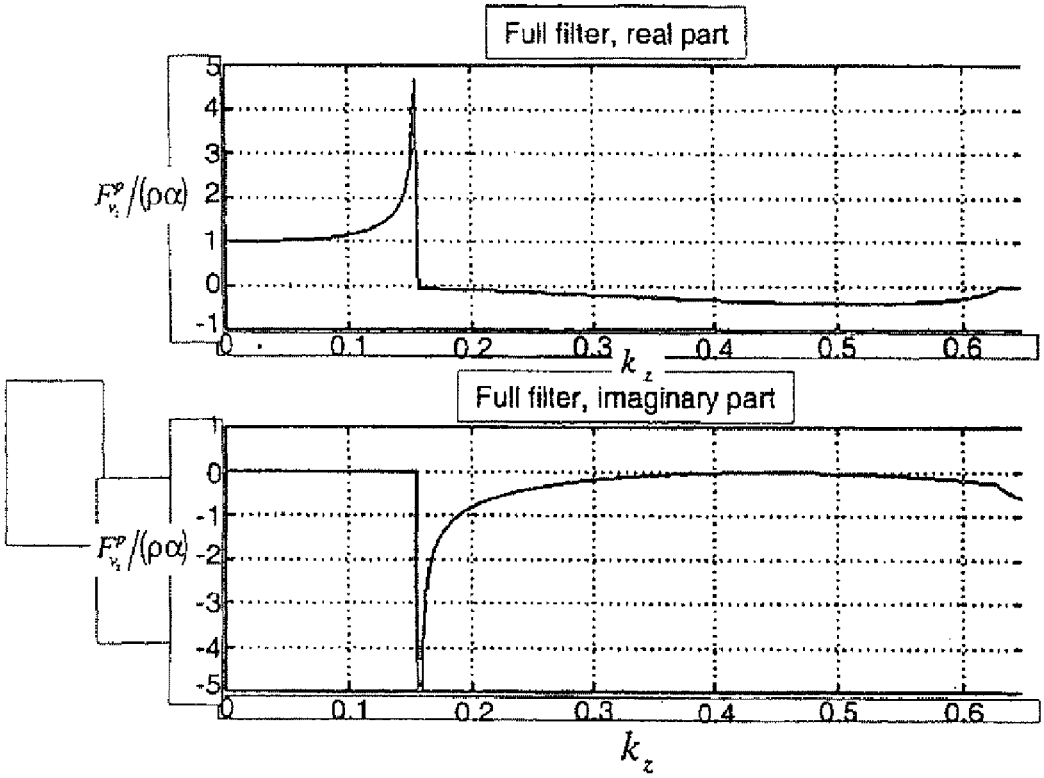
Figure 2 (prior art)
FIG. 2 shows an exact pressure de-ghosting filter for OBC data for a seafloor with P-velocity of 2000 m/s, S-velocity of 500 m/s and density of 1800 kg/m3; the upper panel shows the Real part of exact filter; and the lower panel shows the Imaginary part of exact filter.
Figure 3:
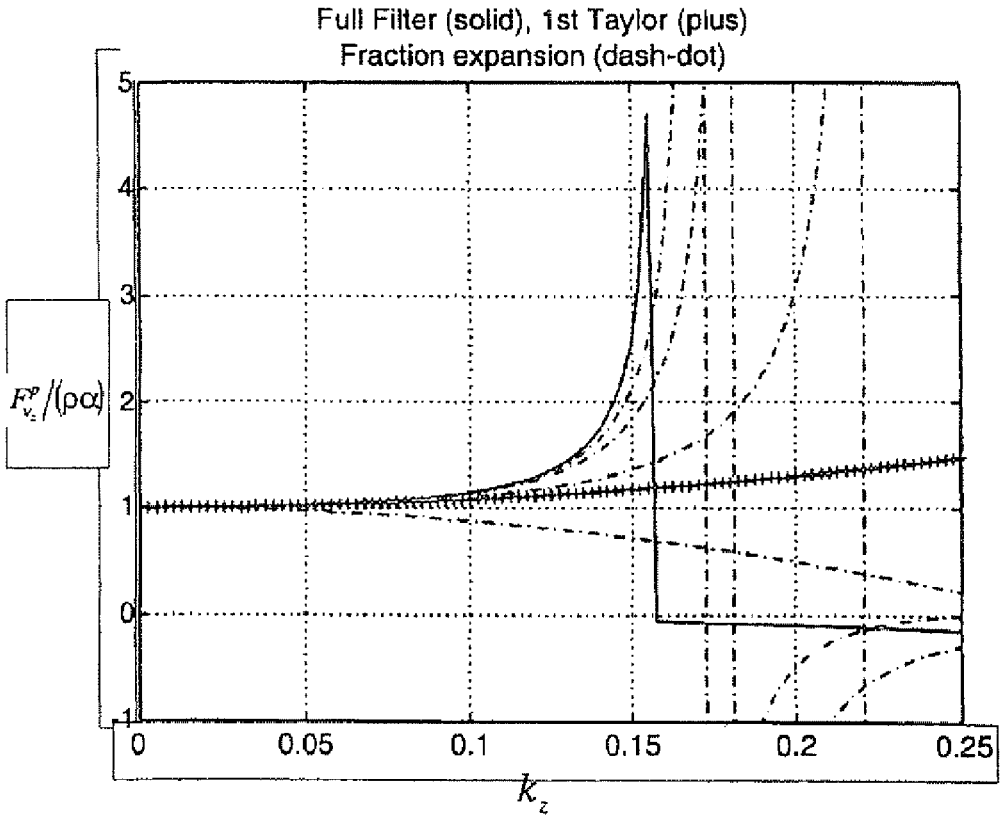
Figure 3 (prior art)
FIG. 3 shows the Real part of the exact OBC de-ghosting filter (in the solid line) shown in FIG. 2, the first order Taylor approximation filter (in the plus line), and the first four fractional expansion approximations filters (in the dash-dotted lines)

FIG. 1 is a schematic diagram showing reflections between a sea surface (S), sea floor (W) and a target reflector (T). Various events that will be recorded in the seismogram are shown and are labelled according to the series of interfaces they are reflected at. The stars indicate the seismic source and the arrowheads indicate the direction of propagation at the receiver. Events ending with 'S' were last reflected at the rough sea surface and are called receiver ghost events. Down-going sea-surface ghost reflections are an undesirable source of contamination, obscuring the interpretation of the desired up-going reflections from the earth's sub-surface.

Rough seas are a source of noise in seismic data. Aside from the often-observed swell noise, further errors are introduced into the reflection events by ghost reflection and scattering from the rough sea surface. The rough sea perturbed ghost events introduce errors that are significant for time-lapse seismic surveying and the reliable acquisition of repeatable data for stratigraphic inversion.

The effect of the rough sea is to perturb the amplitude and arrival time of the sea surface reflection ghost and add a scattering coda, or tail, to the ghost impulse. The impulse response can be calculated by finite difference or Kirchhoff methods (for example) from a scattering surface which represents statistically typical rough sea surfaces. For example, a directional form of the Pierson-Moskowitz spectrum described by Pierson, W. J. and Moskowitz, L., 1964 'A proposed Spectral Form for Fully Developed Wind Seas Based on the Similarity Theory of S. A. Kitaigorodskii' J. Geo. Res., 69, 24, 5181-5190, (hereinafter "Pierson and Moskowitz (1964)"), and Hasselmann, D. E., Dunckel, M. and Ewing, J. A., 1980 'Directional Wave Spectra Observed During JONSWAP 1973', J. Phys. Oceanography, v10, 1264-1280, (hereinafter "Hasselmann et al, (1980)"). Both the wind's speed and direction define the spectra. The Significant Wave Height ("SWH") is the subjective peak to trough wave amplitude, and is about equal to 4 times the RMS wave height. Different realisations are obtained by multiplying the 2D surface spectrum by Gaussian random complex numbers.

Figure 4:
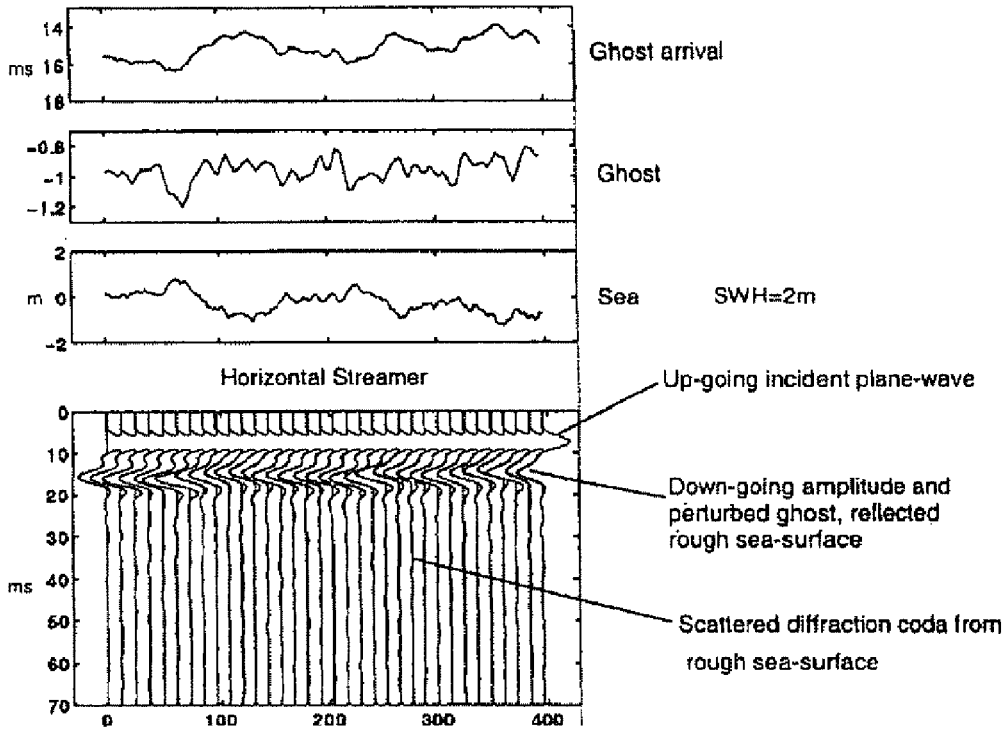
FIG. 4 illustrates the potential impact of 3D rough sea surface ghost reflection and scattering on consistency of the seismic data waveform.

FIG. 4 shows an example of rough sea impulses along a 400 m 2D line (e.g. streamer) computed under a 2 m SWH 3D rough sea surface. The streamer shape affects the details of the impulses, and in this example the streamer is straight and horizontal. FIG. 4 shows, from top to bottom: The ghost wavelet (white trough) arrival time, the ghost wavelet maximum amplitude, a section through the rough sea realisation above the streamer, and the computed rough sea impulses. The black peak is the upward travelling wave, which is unperturbed; the white trough is the sea ghost reflected from the rough sea surface. The latter part of the wavelet at each receiver is the scattering coda from increasingly more distant parts of the surface. Notice that the amplitude and arrival time ghost perturbations change fairly slowly with offset. The arrival time perturbations are governed by the dominant wavelengths in the sea surface, which are 100-200 m for 2-4 m SWH seas, and the amplitude perturbations are governed by the curvature of the sea surface which has an RMS radius of about 80 m and is fairly independent of sea state. The diffraction coda appear as quasi-random noise following the ghost pulse.

The rough sea perturbations cause a partial fill and a shift of the ghost notch in the frequency domain. They also add a small ripple to the spectrum, which amounts to 1-2 dB of error for typical sea states. In the post stack domain this translates to an error in the signal that is about −20 dB for a 2 m SWH sea.

Figure 5:
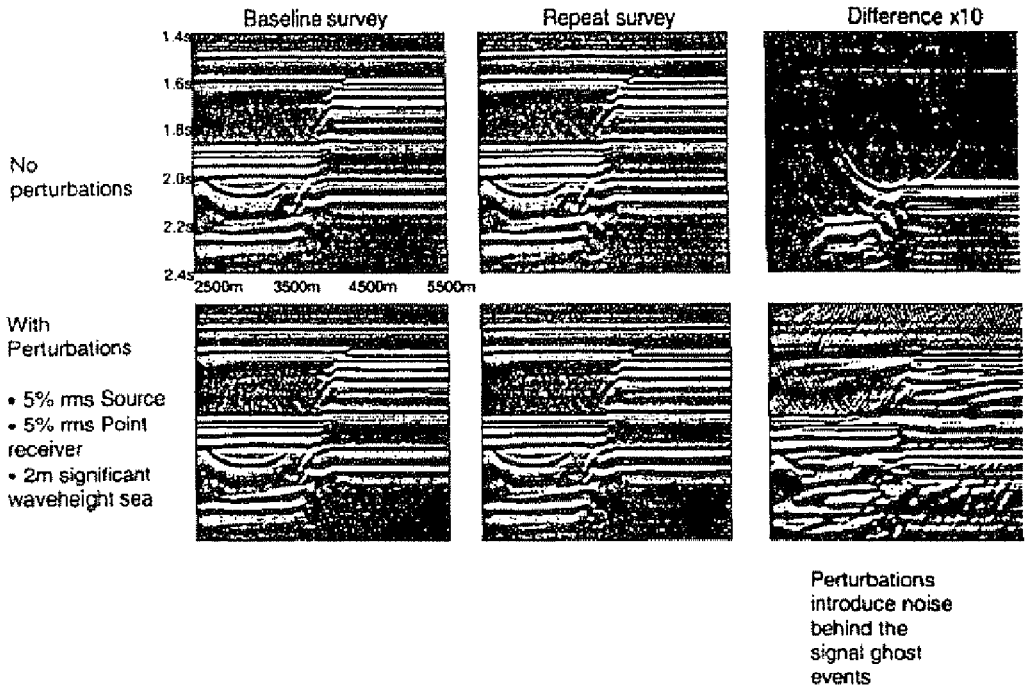
FIG. 5 illustrates the potential impact of the rough sea surface ghost perturbation on time-lapse seismic data quality.

FIG. 5 shows an example of bow such an error can be significant for time-lapse surveys. The panel on the top left shows a post-stack time-migrated synthetic finite difference seismic section. The top middle panel shows the same data but after simulating production in the oil reservoir by shifting the oil water contact by 6 m and introducing a 6 m partial depletion zone above this. The small difference is just noticeable on the black leg of the reflection to the right of the fault just below 2 s two-way travel-time. The panel on the right (top) shows the difference between these two sections multiplied by a factor of 10. This is the ideal seismic response from the time-lapse anomaly.

The left and middle bottom panels show the same seismic sections, but rough sea perturbations for a 2 m SWH (as described above) have been added to the raw data before processing. Note that different rough sea effects are added to each model to represent the different seas at the time of acquisition. The difference obtained between the two sections is shown on the bottom right panel (again multiplied by a factor of 10). The errors in the reflector amplitude and phase (caused by the rough sea perturbations) introduce noise of similar amplitude to the true seismic time-lapse response. To a great extent, the true response is masked by these rough sea perturbations. A method for correcting these types of error is clearly important in such a case, and with the increasing requirement for higher quality, low noise-floor data, correction for the rough sea ghost becomes necessary even in modest sea states.

Equation (1) gives the frequency domain expression for a preferred filter relating the up-going pressure field, $p^u(x)$, to the total pressure, $p(x)$, and vertical particle velocity, $v_z(x)$.

$$p^u(x) = 0.5\left[p(x) + \frac{p\omega}{k_z} * v_z(x)\right] \tag{1}$$

where $k_z$ is the vertical wavenumber for compressional waves in the water, $\rho$ is the density of water and * denotes spatial convolution.

Figure 7:
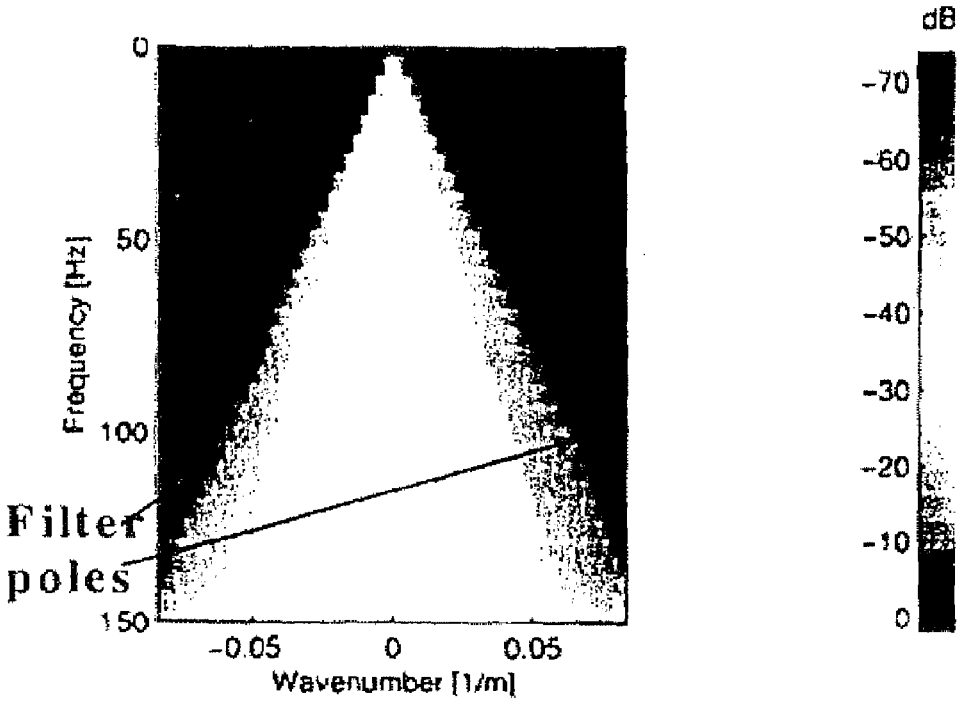
FIG. 7 shows an exemplary two-dimensional spatial filter response ($\omega/k_2$) for dx=6 m.

The vertical wavenumber is calculated from $k_z^2=k^2-k_x^2$ for two-dimensional survey geometries, or $k_2^2=k^2-k_x^2-k_y^2$ for three-dimensional survey geometries, with $k^2=\omega^2/c^2$, where c is the compressional wave speed in the water and $k_x$ is the horizontal wavenumber for compressional waves in the water. The regular sampling of typical towed streamer data allows $k_z$ to be calculated efficiently in the FK domain. FIG. 7 shows an example of the filter response, $\omega/k_z$ for dx=6 m (the filter is normalised for the display to an arbitrary value). Infinite gain poles occur when $k_z$ is zero. This corresponds to energy propagating horizontally (at the compressional wave speed in water). For towed streamer data, there is little signal energy with this apparent velocity, any noise present in the data with this apparent velocity should be filtered out prior to the filter application, or, the filter should be tapered at the poles prior to application to avoid amplification of the noise.

The traditional filter (White (1965), Barr, (1990)) is equation (2):

$$p^u=0.5[p+\rho c v_z] \tag{2}$$

By comparison to equation (1), we see that this is a normal incidence approximation, which occurs when $k_x$ is zero. This is implemented as a simple scaling of the vertical velocity trace followed by its addition to the pressure trace.

Equation (1) can also be formulated in terms of the vertical pressure gradient (dp(x)/dz). The vertical pressure gradient is proportional to the vertical acceleration:

$$dp(x)/dz=\rho dv_z(x)/dt \tag{3}$$

Integrating in the frequency domain through division of $i\omega$, and substituting in equation (1) gives:

$$p^u(x) = 0.5\left[p(x) + \frac{1}{ik_z} * dp(x)/dz\right] \tag{4}$$

Figures 6E, 6F:
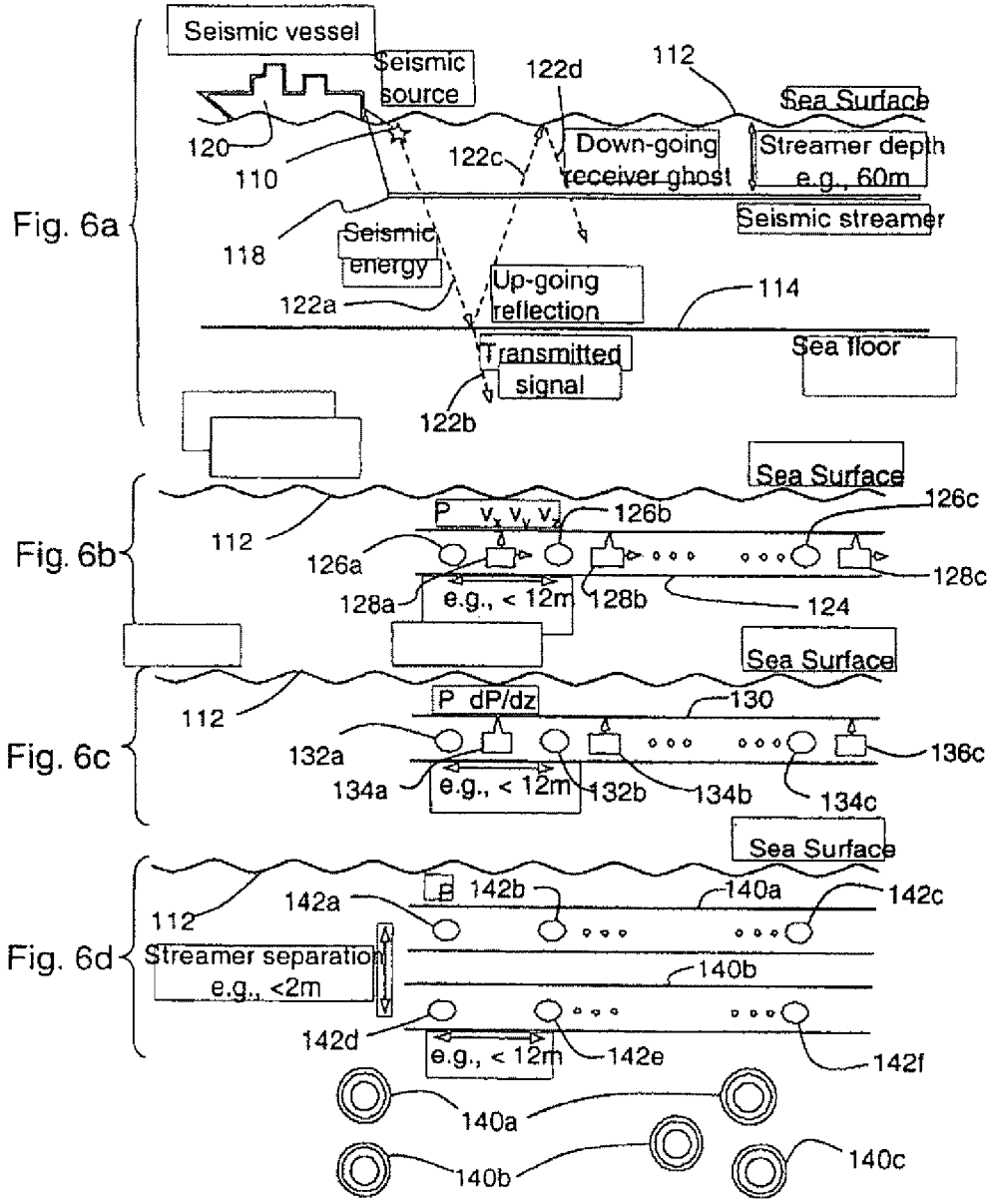

FIGS. 6a-6f show various embodiments for data acquisition set-ups and streamer configurations according to preferred embodiments of the invention. FIG. 6a shows a seismic vessel 120 towing a seismic source 110 and a seismic streamer 118. The sea surface is shown by reference number 112. In this example, the depth of streamer 118 is about 60 meters, however those of skill in the art will recognise that a much shallower depth would ordinarily be used such as 6-10 meters. The dashed arrows 122a-d show paths of seismic energy from source 110. Arrow 122a shows the initial down-going seismic energy. Arrow 122b shows a portion of the seismic energy that is transmitted through the sea floor 114. Arrow 122c shows an up-going reflection. Arrow 122d shows a clown-going ghost reflected from the surface. According to the invention, the down-going rough sea receiver ghost 122d can be removed from the seismic data.

FIGS. 6b-6f show greater detail of acquisition set-ups and streamer configurations, according to the invention. FIG. 6b shows a multi-component streamer 124. The streamer 124 comprises multiple hydrophones (measuring pressure) 126a, 126b, and 126c, and multiple 3C geophones (measuring particle velocity in three directions x, y, and z) 128a, 128b, and 128c. The spacing between the hydrophones 126a and 126b, and between geophones 128a and 128b is shown to be less than 12 meters. Additionally, the preferred spacing in relation to the frequencies of interest is discussed in greater detail below.

FIG. 6c shows a streamer 130 that comprises multiple hyrdophones 132a, 132b, and 132c, and multiple pressure gradient measuring devices 134a, 134b, and 134c. The spacing between the hydrophones 132a and 132b, and between pressure gradient measuring devices 134a and 134b is shown to be less than 12 meters.

FIG. 6d shows a multi-streamer configuration that comprises hydrophone streamers 140a and 140b. The streamers comprise multiple hyrdophones 142a, 142b, and 142c in the case of streamer 140a, and 142d, 142e, and 142f in the case of streamer 140b. The spacing between the hydrophones is shown to be less than 12 meters. The separation between steamers 140a and 140b in the example shown in FIG. 6d is less then 2 meters. Although the preferred separation is less than 2 meters, greater separations are contemplated as being within the scope of the invention. FIG. 6e shows a cross sectional view of a dual streamer arrangement. FIG. 6f shows a multi-streamer configuration comprising three hydrophone streamers 140a, 140b, and 140c.

Adequate spatial sampling of the wavefield is highly preferred for the successful application of the de-ghosting filters. For typical towed streamer marine data, a spatial sampling interval of 12 m is adequate for all incidence angles. However, to accurately spatially sample all frequencies up to 125 Hz (for all incidence angles), a spatial sampling interval of 6.25 meters is preferred. These spacings are determined according to the Nyquist spatial sampling criterion. Note that if all incidence angles are not required, a coarser spacing than described above can be used. The filters can be applied equally to both group formed or point receiver data.

Figure 8:
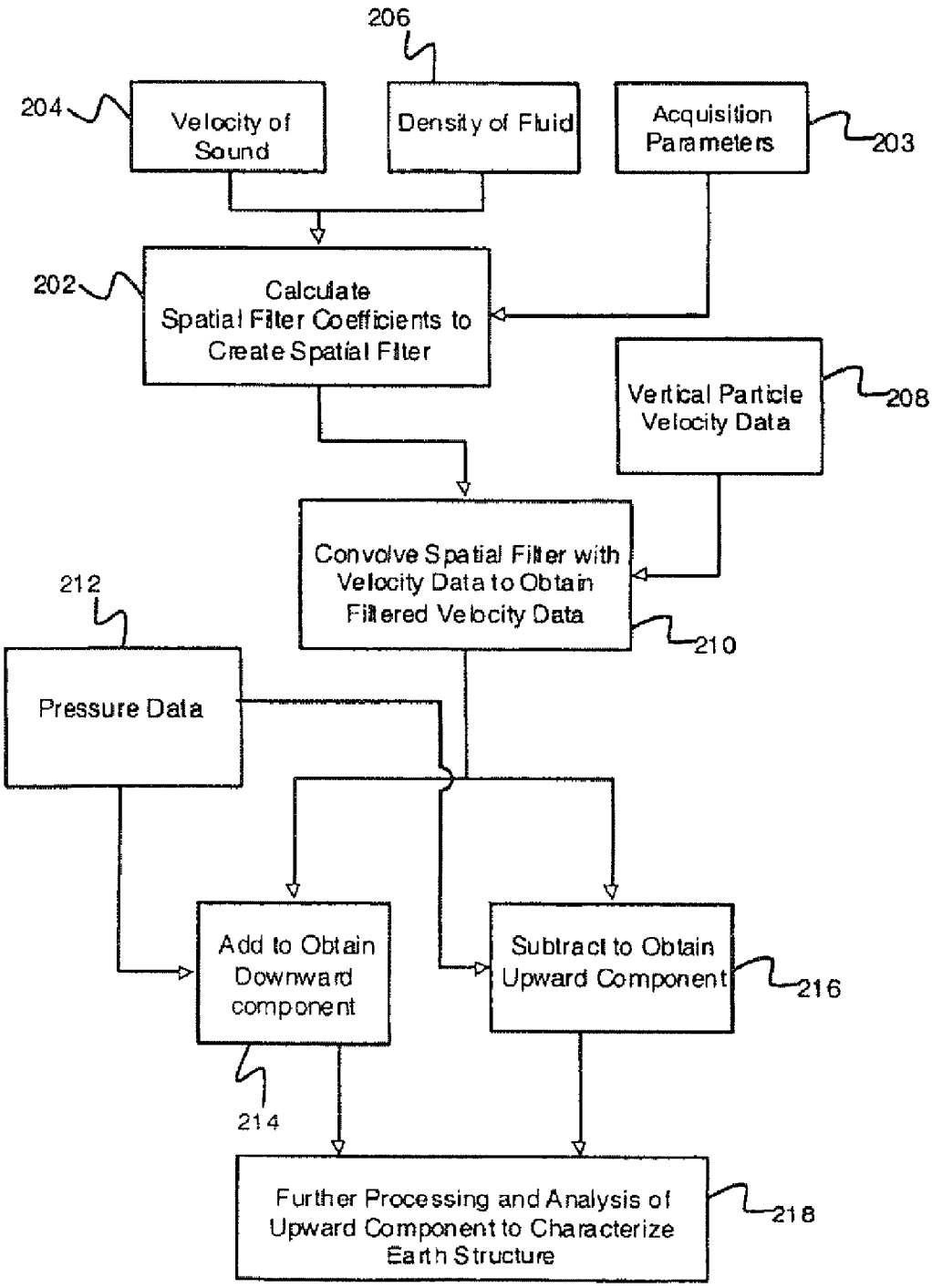
FIG. 8 is a flow chart illustrating some of the steps of the de-ghosting method for the combination of pressure and vertical velocity data to achieve separated pressure data, according to a preferred embodiment of the invention.

FIG. 8 is a flow chart illustrating some of the steps of the de-ghosting method for the combination of pressure and vertical velocity data to achieve separated pressure data, according to a preferred embodiment of the invention. In step 202, spatial filter coefficients are calculated. The coefficients are preferably dependent on the cbaracteristics of the acquisition parameters 203 (such as the temporal sample interval of the pressure and particle motion data, the spatial separation of the vertical particle motion measuring devices, and the spatial aperture of the filter), the density of the fluid medium 206, and the speed of the compressional wave in the fluid medium (or velocity of sound) 204. Vertical particle motion data 208 and pressure data 212 are received, typically stored as time domain traces on a magnetic tape or disk. In step 210, the vertical particle motion data 208 are convolved in with the spatial filter to yield filtered vertical particle motion data. In step 214 the filtered vertical particle motion data are added to pressure data 212 to give the downward propagating component of the separated pressure data. Alternatively, in step 216 the filtered vertical particle motion data are subtracted from pressure data 212 to give the upward propagating component of the separated pressure data. Finally, in step 218 the upward component is further processes and analysed.

Figure 9:
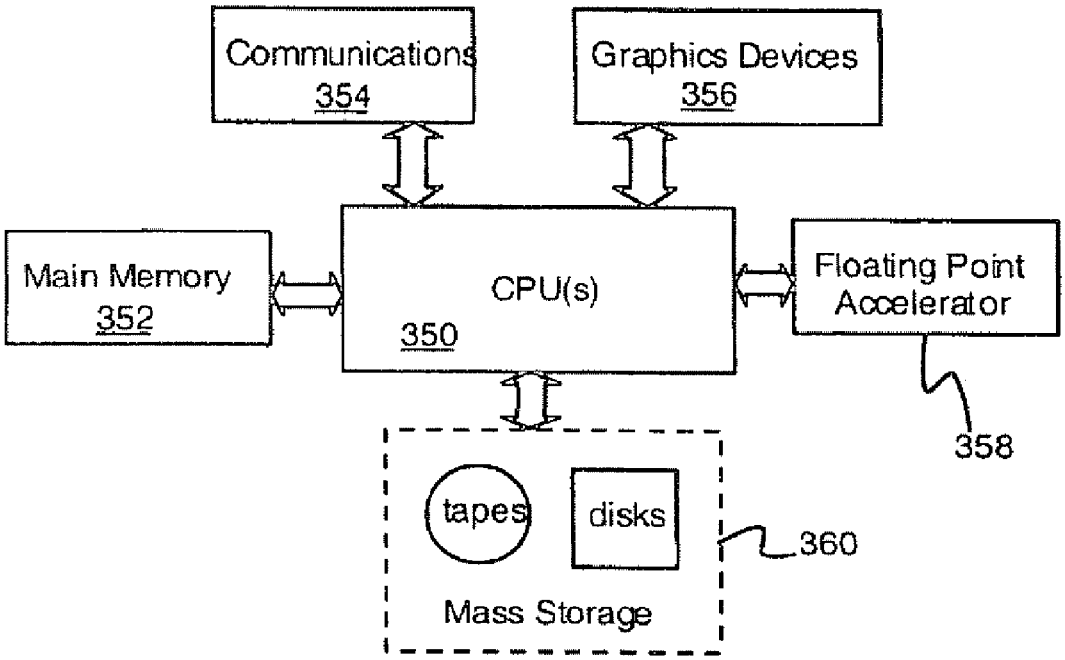
FIG. 9 schematically illustrates an example of a data processor that can be used to carry out preferred embodiments of the invention.

The processing described herein is preferably performed on a data processor configured to process large amounts of data. For example, FIG. 9 illustrates one possible configuration for such a data processor. The data processor typically consists of one or more central processing units 350, main memory 352, communications or I/O modules 354, graphics devices 356, a floating point accelerator 358, and mass storage devices such as tapes and discs 360. It will be understood by those skilled in the art that tapes and discs 360 are computer-readable media that can contain programs used to direct the data processor to carry out the processing described herein.

Figure 10:
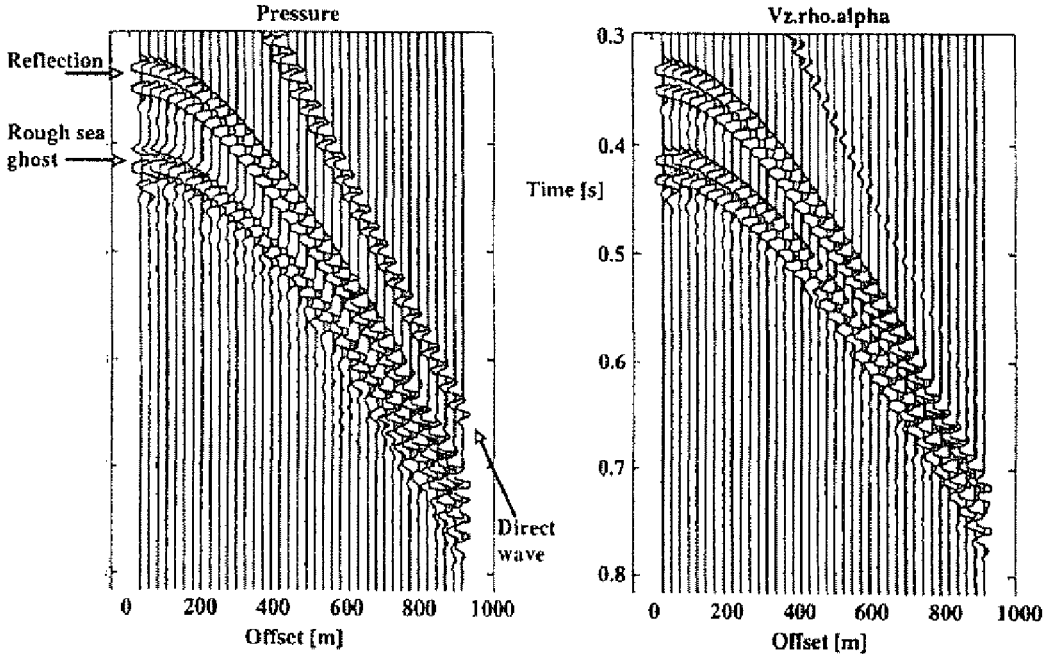
FIG. 10 shows an example of a shot record computed below a 4 m significant wave height (SWH) rough sea surface, the left panel shows pressure, and the right panel shows vertical velocity scaled by water density and the compressional wave speed in water.

FIG. 10 shows a shot record example, computed under a 4 m Significant Wave Height (SWH) sea and using the finite-difference method described by Robertsson, J. O. A., Blanch, J. O. and Symes, W. W., 1994 'Viscoelastic finite-difference modelling' Geophysics, 59, 1444-1456 (hereinafter "Robertsson et al. (1994)") and Robertsson, J. O. A., 1996 'A Numerical Fret-Surface Condition for Elastic/Viscoelastic Finite-difference modelling in the Presence of Topography', Geophysics, 61, 6, 1921-1934 (hereinafter "Robertsson (1996)"). The streamer depth in this example is 60 m. The left panel shows the pressure response and the right panel shows the vertical velocity response scaled by the water density and the compressional wave speed in water. A paint source 50 Hz Ricker wavelet was used and the streamer depth was 60 m in this example. The choice of streamer depth allows a clear separation of the downward travelling ghost from the upward travelling reflection energy for visual clarity of the de-ghosting results. The trace spacing on the plot is 24 m. A single reflection and its associated ghost are shown, along with the direct wave travelling in the water layer. Perturbations in the ghost wavelet and scattering noise from the rough sea surface are evident.

Figure 11:
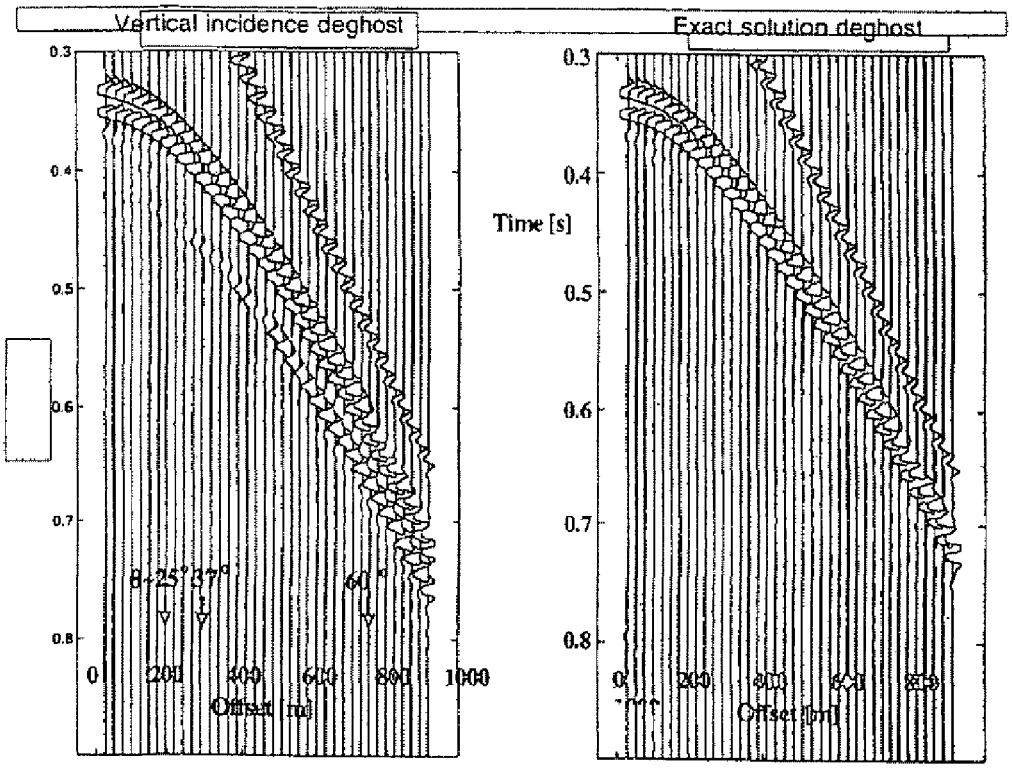
FIG. 11 illustrates de-ghosting results of the shot record in FIG. 10, the left panel shows results using the vertical incidence approximation, and the right panel illustrates the exact solution.

FIG. 11 shows the results of de-ghosting the shot record shown in FIG. 10. The left panel shows the result using the normal incidence approximation and the right panel shows the result using the exact solution. The exact solution shows a consistent response over all offsets, whereas the normal incidence approximation starts to break down at incident angles greater than about 20 degrees, and shows a poorer result at the near offsets. Note that the direct wave is not amplified by the exact filter application even though the poles of the filter lie close to its apparent velocity. The exact filter is tapered before application such that it is has near unity response for frequencies and wavenumbers corresponding to apparent velocities of 1500 m/s and greater. The weak event just below the signal reflection is a reflection from the side absorbing boundary of the model. It is upward travelling and hence untouched by the filter.

Figure 12:
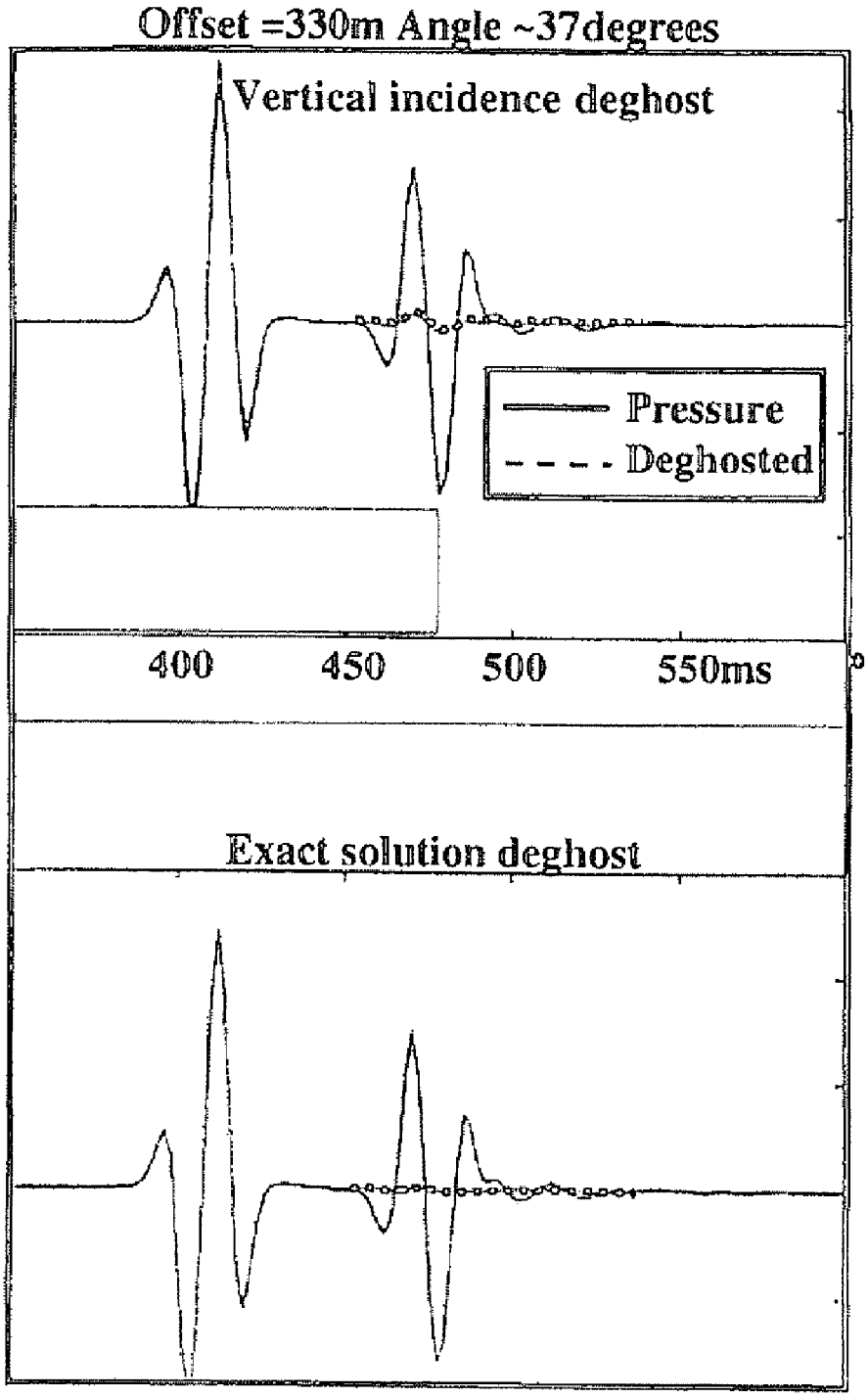
FIG. 12 illustrates an example of de-ghosting results in detail for a single trace at 330 m offset corresponding to an arrival angle of about 37 degrees, the upper panel shows the vertical incidence approximation, and the lower panel shows the Exact solution.
Figure 12A:
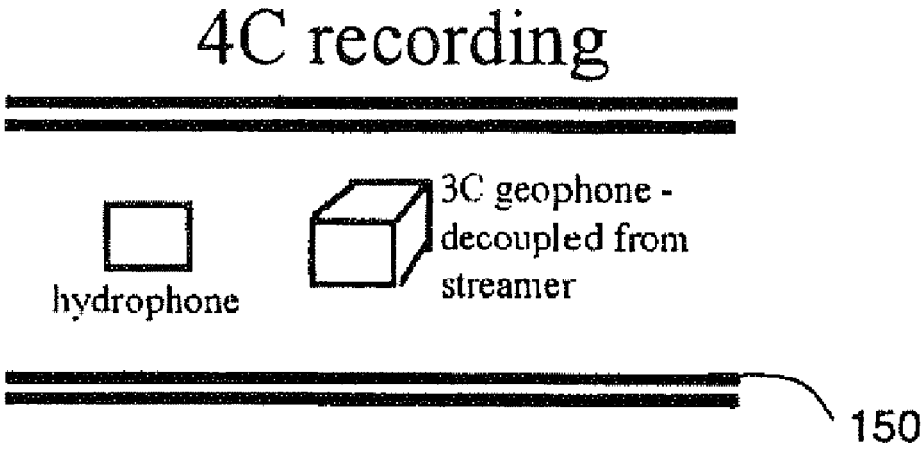
FIGS. 12a-b illustrate two possible examples of multi-component streamer design.
Figure 12B:
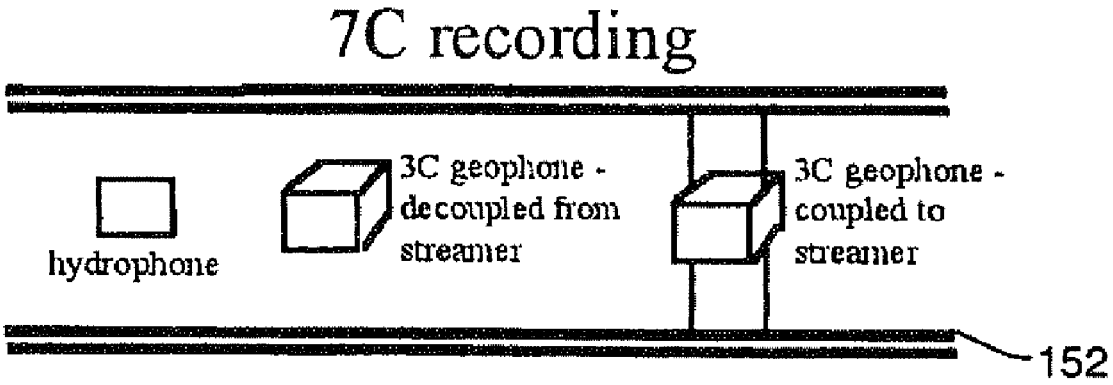

FIG. 12 shows details of the de-ghosted results for a single trace from FIG. 11. The trace offset is 330 m corresponding to a 37 degree incidence angle. The upper panel shows the normal incidence approximation, and the lower panel shows the exact solution. Not only does the exact solution provide a superior result in terms of the de-ghosting, but also in terms of amplitude preservation of the signal reflection—the upper panel shows loss of signal amplitude after the de-ghosting.

The filters described herein are applicable to, for example, measurements of both pressure and vertical velocity along the streamer. Currently, however, only pressure measurements are commercially available. Therefore, engineering of streamer sections that are capable of commercially measuring vertical velocity is preferred in order to implement the filters.

FIGS. 13a-b illustrate two possible examples of multi-component streamer design. FIG. 13a shows a coincident pressure and single 3-component geophone. In this design, the 3-component geophone is perfectly decoupled from the streamer. FIG. 13b shows a coincident pressure and twin 3-component geophones. In this design, one of the 3-component geophones is decoupled from the streamer, the other is coupled to the streamer; measurements from both are combined to remove streamer motion from the data.

In an alternative formulation, the filters make use of vertical pressure gradient measurements. An estimate of vertical pressure gradient can be obtained from over/under twin streamers (such as shown in FIGS. 6d and 6e) and multiple streamers (such as shown in FIG. 6f) deployed in configurations analogous to that described in Robertsson (1998), allowing the filters to be directly applied to such data. However, for the results to remain sufficiently accurate, the streamers should not be vertically separated by more than 2 m for seismic frequencies below approximately 80 Hz.

An important advantage of multiple streamer configurations such as shown in FIG. 6f is that their relative locations are less crucial than for over/under twin streamer geometries, where the two streamers are preferably directly above one another.

The filters described here are applied in 2D (along the streamer) to data modelled in 2D. The application to towed streamer configurations naturally lends itself to this implementation, the cross-line (streamer) sampling of the wavefield being usually insufficient for a full 3D implementation. Application of these filters to real data (with ghost reflections from 3D sea surfaces) will give rise to residual Coors caused by scattering of the wavefield from the cross-line direction. This error increases with frequency though is less than 0.5 dB in amplitude and 3.6° in phase for frequencies up to 150 Hz, for a 4 m SWH sea. These small residual noise levels are acceptable when time-lapse seismic surveys are to be conducted.

Invoking the principle of reciprocity, the filters can be applied in the common receiver domain to remove the downward travelling source ghost. Reciprocity simply means that the locations of source and receiver pairs can be interchanged, (the ray path remaining the same) without altering the seismic response. FIG. 1 can also be used to define the source ghost if the stars are now regarded as receivers and the direction of the arrows is reversed, with the source now being located at the arrow. This application is particularly relevant for data acquired using vertical cables, which may be tethered, for example, to the sea floor, or suspended from buoys. In the case of FIG. 6a, those of skill in the art will understand that as the seismic vessel 120 travels though the water, the firing position of source 110 will change. The different positions of source 110 can be then be used to construct data in the common receiver domain as is well known in the art.

While preferred embodiments of the invention have been described, the descriptions and figures are merely illustrative and are not intended to limit the present invention.

What is claimed is:

[1. A method of reducing the effects in seismic data of downward propagating reflected and scattered acoustic energy travelling in a fluid medium comprising the steps of:

receiving pressure data representing at least the pressure in the fluid medium at a first location and a second location, the first location being in close proximity to the second location;

receiving vertical particle motion data representing at least the vertical particle motion of acoustic energy propagating in the fluid medium at a third location and a fourth location, the third location being in close proximity to the fourth location, and the first, second, third and fourth locations being within a spatial area;

calculating a plurality of spatial filter coefficients based in part on the velocity of sound in the fluid medium, the density of the fluid medium and a plurality of acquisition parameters, thereby creating a spatial filter which is designed so as to be effective at separating up and down propagating acoustic energy over a range of non-vertical incidence angles in the fluid medium;

applying the spatial filler to the vertical particle motion data to generate filtered particle motion data;

combining the filtered particle motion data with the pressure data to generate separated pressure data, the separated pressure data having up and down propagating components separated; and analysing at least part of the up or down propagating component of the separated pressure data, and wherein said vertical particle motion data is measured using one or more multi-component streamers or vertical cables having receivers located substantially above the sea floor.]

[2. The method of claim 1 wherein the acquisition parameters include the temporal sampling interval, the spatial sampling interval, and the number of independent locations at which the pressure and vertical particle motion data are measured.]

[3. The method of claim 1 wherein the vertical particle motion data is measured using one or more multi-component streamers.]

[4. The method of claim 1 wherein the vertical particle motion of the acoustic energy represented in said vertical particle motion data is the particle velocity of the acoustic energy.]

[5. The method of claim 1 wherein the vertical particle motion of the acoustic energy represented in said vertical particle motion data is the vertical pressure gradient of the acoustic energy.]

[6. The method of claim 5 wherein the pressure gradient is measured using at least two parallel streamer cables in close proximity and vertically offset from one another.]

[7. The method of claim 1 wherein the vertical particle motion of the acoustic energy represented in said vertical particle motion data is the vertical displacement of the acoustic energy.]

[8. The method of claim 1 wherein the vertical particle motion of the acoustic energy represented in said vertical particle motion data is the vertical acceleration of the acoustic energy.]

[9. The method of claim 1 wherein the distance between the first location and the second location and the distance between the third location and the fourth location is less than the Nyquist spatial sampling criterion.]

[10. The method of claim 9 wherein the spatial area is substantially a portion of a line, and the range of non-vertical incidence angles includes substantially all non-horizontal incidence angles within a vertical plane that passes through the portion of line.]

[11. The method of claim 9 wherein the spatial area is a portion of a substantially planar region, and the range of non-vertical incidence angles include substantially all non-horizontal incidence angles.]

[12. A method of reducing the effects in seismic data of downward propagating reflected and scattered acoustic energy travelling in a fluid medium comprising the steps of:

receiving pressure data representing at least the pressure in the fluid medium at a first location and a second location, the first location being in close proximity to the second location;

receiving vertical particle motion data representing at least the vertical particle motion of acoustic energy propagating in the fluid medium at a third location and a fourth location, the third location being in close proximity to the fourth location, and the first, second, third and fourth locations being within a spatial area;

calculating a plurality of spatial filter coefficients based in part on the velocity of sound in the fluid medium and the density of the fluid medium, thereby creating a spatial filter which is designed so as to be effective at separating up and down propagating acoustic energy over a range of non-horizontal incidence angles in the fluid medium;

applying the spatial filter to the pressure data to generate filtered pressure data;

combining the filtered pressure data with the vertical particle motion data to generate separated pressure data, the separated pressure data having up and down propagating components separated; and analysing at least part of the up or down propagating component of the separated pressure data, and wherein said vertical particle motion data is measured using one or more multi-component streamers or vertical cables having receivers located substantially above the sea floor.]

[13. The method of claim 12 wherein the distance between the first location and the second location and the distance between the third location and the fourth location is less than the Nyquist spatial sampling criterion.]

[14. The method of claim 12 wherein the vertical particle motion data is measured using one or more multi-component streamers.]

[15. The method of claim 12 wherein the vertical particle motion of the acoustic energy represented in said vertical particle motion data is the particle velocity of the acoustic energy.]

[16. The method of claim 12 wherein the vertical particle motion of the acoustic energy represented in said vertical particle motion data is the vertical pressure gradient of the acoustic energy.]

[17. The method of claim 16 wherein the pressure gradient is measured using at least two parallel streamer cables in close proximity and vertically offset from one another.]

[18. A method of reducing the effects in seismic data of downward propagating reflected and scattered acoustic energy travelling in a fluid medium comprising the steps of:

receiving pressure data representing at least variations in pressure in the fluid medium at a first location, the variations caused in part by a first source event and a second source event, the first source event and the second source event being within a spatial area;

receiving vertical particle motion data representing at least the vertical particle motion of acoustic energy propagating in the fluid medium at a second location, the acoustic energy being caused in part by the first source event and the second source event;

calculating a plurality of spatial filter coefficients based in part on the velocity of sound in the fluid medium and the density of the fluid medium, thereby creating a spatial filter which is designed so as to be effective at separating up and down propagating acoustic energy from the first source event and second source event over a range of non-horizontal incidence angles in the fluid medium;

applying the spatial filter to the vertical particle motion data to generate filtered particle motion data;

combining the filtered particle motion data with the pressure data to generate separated pressure data, the separated pressure data having up and down propagating components separated; and analysing at least part of the up or down propagating component of the separated pressure data, and wherein said vertical particle motion data is measured using one or more multi-component streamers or vertical cables having receivers located substantially above the sea floor.]

[19. The method of claim 18 wherein the first source event and the second source event are generated by firing a seismic source at different locations at different times, and the distance between the location of the first source event and the location of the second source event is less than the Nyquist spatial sampling criterion.]

[20. The method of claim 18 wherein the vertical particle motion data is measured using one or more multi-component streamers.]

[21. The method of claim 18 wherein the vertical particle motion of the acoustic energy represented in said vertical particle motion data is the particle velocity of the acoustic energy.]

[22. The method of claim 18 wherein the vertical particle motion of the acoustic energy represented in said vertical particle motion data is the vertical pressure gradient of the acoustic energy.]

[23. The method of claim 22 wherein the pressure gradient is measured using at least two parallel streamer cables in close proximity and vertically offset from one another.]

[24. A computer-readable medium which can be used for directing an apparatus to reduce the effects in seismic data of downward propagating reflected and scattered acoustic energy travelling in a fluid medium comprising:

means for retrieving pressure data representing at least the pressure in the fluid medium at a first location and a second location, the first location being in close proximity to the second location;

means for retrieving vertical particle motion data representing at least the vertical particle motion of acoustic energy propagating in the fluid medium at a third location and a fourth location, the third location being in close proximity to the fourth location, and the first, second, third and fourth locations being within a spatial area;

means for calculating a plurality of spatial filter coefficients based in part on the velocity of sound in the fluid medium, the density of the fluid medium and a plurality of acquisition parameters, thereby creating a spatial fiber which is designed so as to be effective at separating up and down propagating acoustic energy over a range of non-vertical incidence angles in the fluid medium;

means for applying the spatial filter to the vertical particle motion data to generate filtered particle motion data;

means for combining the filtered particle motion data with the pressure data to generate separated pressure data, the separated pressure data having up and down propagating components separated; and means for analysing at least part of the up or down propagating component of the separated pressure data, and wherein said vertical particle motion data is measured using one or more multi-component streamers or vertical cables having receivers located substantially above the sea floor.]

[25. The computer-readable medium of claim 24 wherein the distance between the first location and the second location and the distance between the third location and the fourth location is less than the Nyquist spatial sampling criterion.]

[26. The computer-readable medium of claim 24 wherein the vertical particle motion data is measured using one or more multi-component streamers.]

[27. The computer-readable medium of claim 24 wherein the vertical particle motion of the acoustic energy represented in said vertical particle motion data is the particle velocity of the acoustic energy.]

[28. The computer-readable medium of claim 24 wherein the vertical particle motion of the acoustic energy represented in said vertical particle motion data is the vertical pressure gradient of the acoustic energy.]

[29. The computer-readable medium of claim 28 wherein the pressure gradient is measured using at least two parallel streamer cables in close proximity and vertically offset from one another.]

*30. A method of reducing the effects in seismic data of downward propagating reflected and scattered acoustic energy travelling in a fluid medium comprising the steps of:*

*receiving pressure data representing at least the pressure in the fluid medium at a first location and a second location, the first location being in close proximity to the second location;*

*receiving vertical particle motion data representing at least the vertical particle motion of acoustic energy propagating in the fluid medium at a third location, and the first, second, and third locations being within a spatial area;*

*calculating a plurality of spatial filter coefficients based in part on the velocity of sound in the fluid medium and the density of the fluid medium, thereby creating a spatial filter which is designed so as to be effective at separating up and down propagating acoustic energy over a range of non-horizontal incidence angles in the fluid medium;*

*applying the spatial filter to the pressure data to generate filtered pressure data;*

*combining the filtered pressure data with the vertical particle motion data to generate separated vertical particle motion data, the separated vertical particle motion data having up and down propagating components separated; and*

*analysing at least part of the up or down propagating component of the separated pressure data, and*

*wherein said vertical particle motion data is measured using one or more multi-component streamers, or over and under twin streamers, or vertical cables having receivers located substantially above the sea floor.*

*31. The method of claim 30 wherein the distance between the first location and the second location is less than the Nyquist spatial sampling criterion.*

*32. The method of claim 30 wherein the vertical particle motion of the acoustic energy represented in said vertical particle motion data is the particle velocity of the acoustic energy.*

*33. The method of claim 30 wherein the vertical particle motion of the acoustic energy represented in said vertical particle motion data is the vertical pressure gradient of the acoustic energy.*

*34. The method of claim 33 wherein the pressure gradient is measured using at least two parallel streamer cables in close proximity and vertically offset from one another.*

*35. A data processor, comprising:*

*a central processing unit;*

*a memory;*

*a program residing on the memory that, when executed by the central processing unit, performs a method including:*

*receiving pressure data representing at least the pressure in the fluid medium at a first location and a second location, the first location being in close proximity to the second location;*

*receiving vertical particle motion data representing at least the vertical particle motion of acoustic energy propagating in the fluid medium at a third location, and the first, second, and third locations being within a spatial area;*

*calculating a plurality of spatial filter coefficients based in part on the velocity of sound in the fluid medium and the density of the fluid medium, thereby creating a spatial filter which is designed so as to be effective at separating up and down propagating acoustic energy over a range of non-horizontal incidence angles in the fluid medium;*

*applying the spatial filter to the pressure data to generate filtered pressure data;*

*combining the filtered pressure data with the vertical particle motion data to generate separated vertical particle motion data, the separated vertical particle motion data having up and down propagating components separated; and*

*analysing at least part of the up or down propagating component of the separated pressure data, and*

*wherein said vertical particle motion data is measured using one or more multi-component streamers, or over and under twin streamers, or vertical cables having receivers located substantially above the sea floor.*

*36. The data processor of claim 35 wherein the distance between the first location and the second location is less than the Nyquist spatial sampling criterion.*

*37. The data processor of claim 35 wherein the vertical particle motion of the acoustic energy represented in said vertical particle motion data is the particle velocity of the acoustic energy or the vertical pressure gradient of the acoustic energy.*

* * * * *